Figure 1:
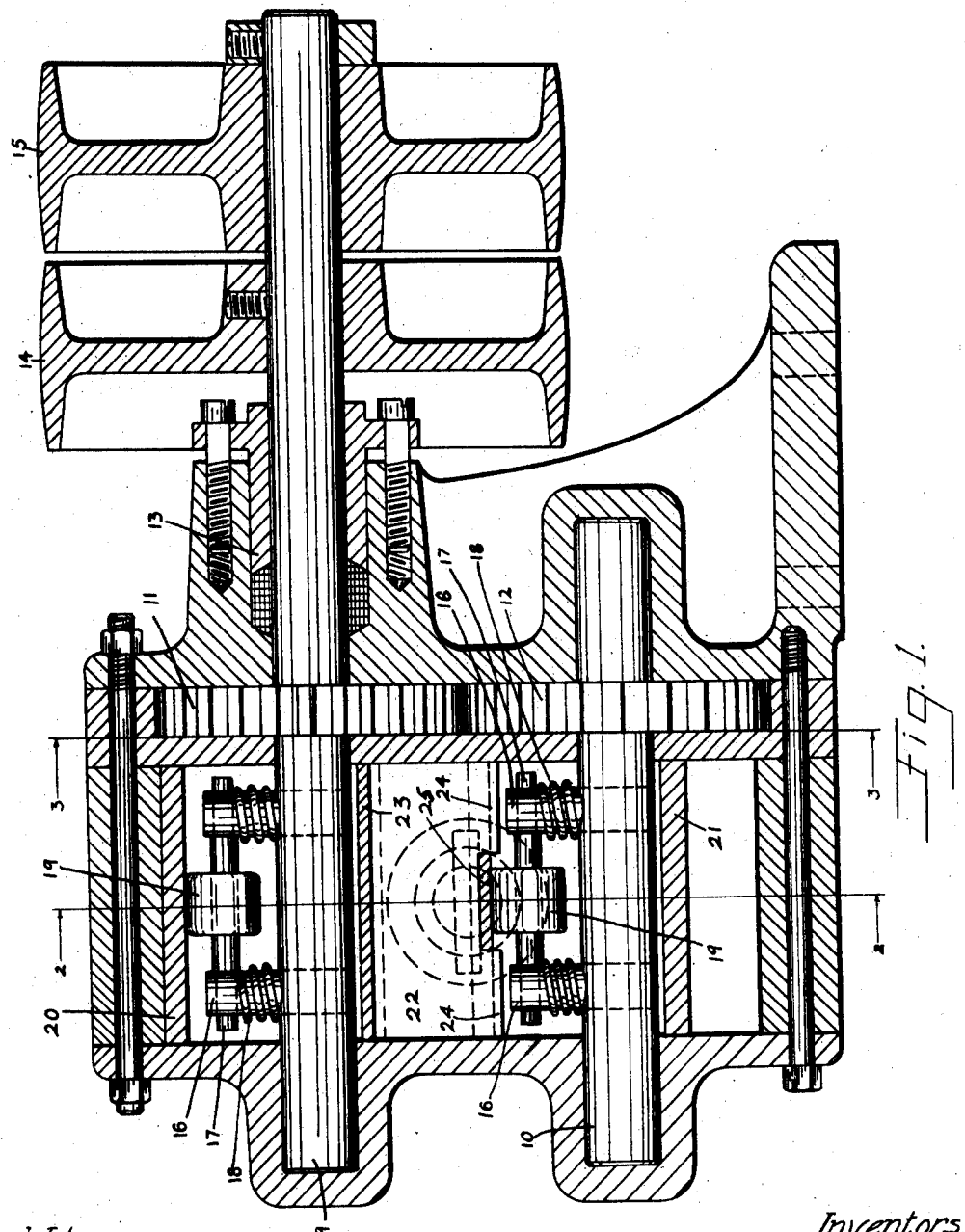

J. R. RICHER AND J. O. HESSLER.
PUMP.
APPLICATION FILED JAN. 5, 1920.

1,401,443.

Patented Dec. 27, 1921.
2 SHEETS—SHEET 1.

Witnesses
Benj. Schechter
B. G. Richards

Inventors.
Joseph R. Richer & John O. Hessler
By Joshua R. H. Potts
Attorney.

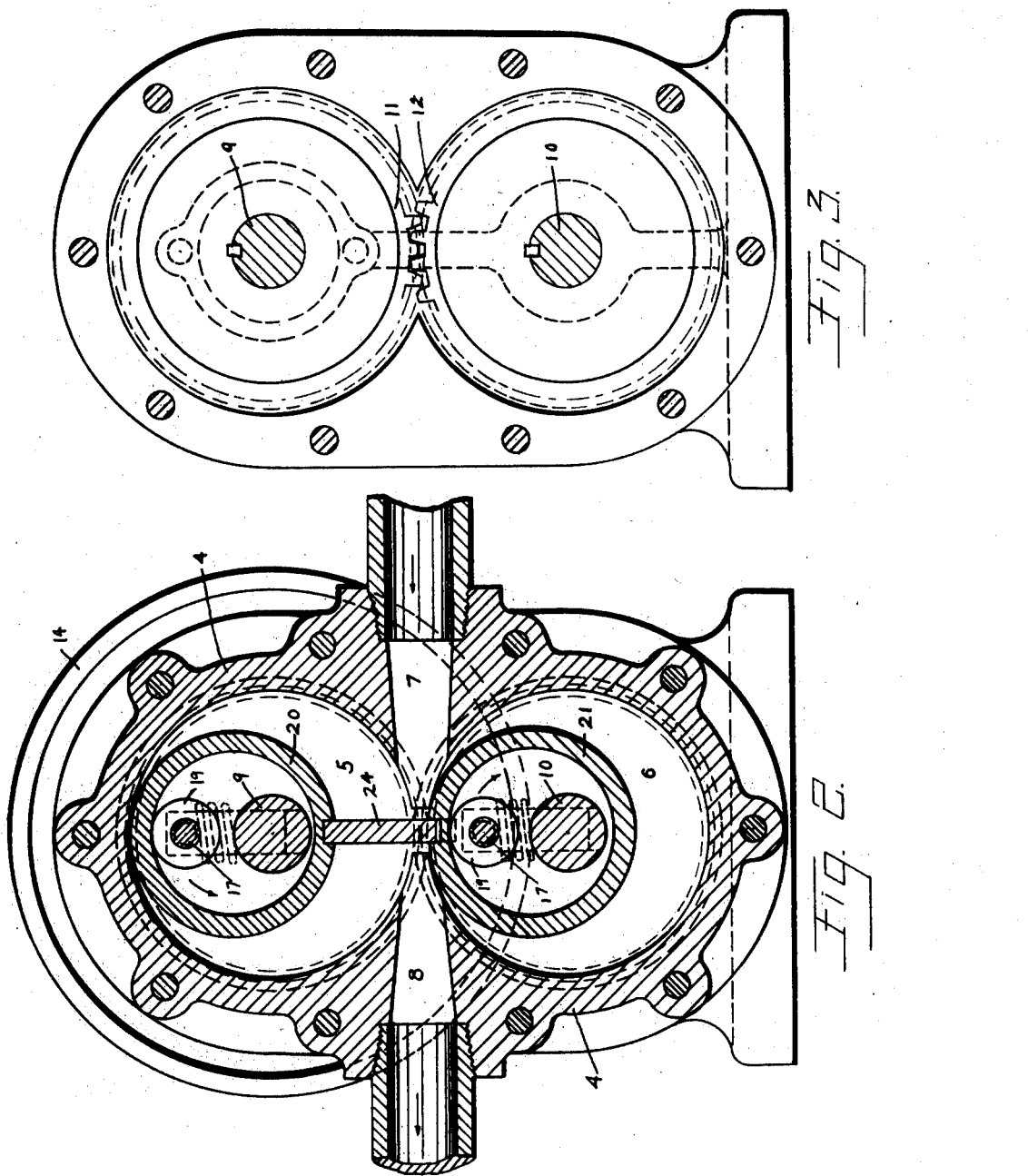

UNITED STATES PATENT OFFICE.

JOSEPH R. RICHER AND JOHN O. HESSLER, OF CHICAGO, ILLINOIS, ASSIGNORS TO STAR TOOL AND MANUFACTURING COMPANY, OF CHICAGO, ILLINOIS, A CORPORATION OF ILLINOIS.

PUMP.

1,401,443.      Specification of Letters Patent.      Patented Dec. 27, 1921.

Application filed January 5, 1920. Serial No. 349,370.

*To all whom it may concern:*

Be it known that we, JOSEPH R. RICHER and JOHN O. HESSLER, citizens of the United States, and residents of the city of Chicago, county of Cook and State of Illinois, have invented certain new and useful Improvements in Pumps, of which the following is a specification.

Our invention relates to improvements in pumps especially adapted for use for pumping liquids, and has for its object the provision of an improved construction of this character which is simple and efficient in use and capable of economical manufacture.

Other objects will appear hereinafter.

The invention consists in the combinations and arrangements of parts hereinafter described and claimed.

The invention will be best understood by reference to the accompanying drawings forming a part of this specification, and in which—

Figure 1, is a longitudinal vertical section of a pump embodying the invention,

Fig. 2, a section taken on line 2—2 of Fig. 1, and

Fig. 3, a section taken on line 3—3 of Fig. 1.

The preferred form of construction, as illustrated in the drawings, comprises a suitable casing 4 having adjoining parallel cylindrical chambers 5 and 6 therein, said chambers intersecting slightly at their adjoining sides to provide open communication between them. An inlet passage and pipe 7 leads into the chambers 5 and 6 at one side of their communication with each other, and an outlet passage and pipe 8 leads out of the chambers 5 and 6 at the opposite side of their communication with each other. Shafts 9 and 10 are mounted in the casing 4, as indicated, coaxially with the chambers 5 and 6, respectively, and intermeshing gears 11 and 12, of equal sizes, are secured respectively to said shafts outside of the chambers 5 and 6 so as to compel rotation of said shafts in unison with each other, at the same speeds and in opposite directions, as indicated by the arrows in Fig. 2. The shaft 9 is extended somewhat beyond the casing 4, through a suitable stuffing box 13, and is provided with tight and loose pulleys 14 and 15 for driving the pump.

Each of the shafts 9 and 10 carries two radiating crank arms 16 slidable diametrically therethrough and carrying at their outer ends a bearing rod 17, as indicated. Compression springs 18 are imprisoned between the ends of the rods 17 and the corresponding periphery of the corresponding shaft, thus serving to press the rods 17 outwardly. Each of the rods 17 carries a roller 19 rotatably mounted thereon on suitable ball bearings, or other friction-alleviating bearing. Contact members 20 and 21, in the form of tube or pipe sections, coextensive in length with the chambers 5 and 6, respectively, are loosely mounted on the rollers 19 and their corresponding shafts. These contact members have bores sufficiently large to embrace freely the rollers 19 and the corresponding shafts, and have their ends nicely finished to contact closely with the ends of the chambers 5 and 6, which are also nicely finished. A blade 22 is fixed in a groove 23 in the under side of the contact tube 20, passes freely through the communication between the chambers 5 and 6, and is slidably connected with the tube 21. This slidable connection with the tube 21 is preferably effected by forming lugs or extensions 24 at opposite sides of the lower edge of the blade 22 adapted to operate through a slot in the upper side of the tube 21 on opposite sides of a bridge or web 25 formed centrally in said slot to provide a smooth bearing surface for the corresponding roller 19.

In operation, upon rotation of shaft 9 in the direction indicated by the arrow in Fig. 2, the shaft 10 will be caused to rotate in the opposite direction and the contact members 20 and 21 to revolve and roll and slide in contact with the peripheries of the chambers 5 and 6, thus practically constantly drawing air or other liquid inwardly through passage and pipe 7, and expelling the same under pressure through the passage and pipe 8. By this means, a simple and effective pump for compressing air or other gases, or for pumping liquids of any description, is provided, which is simple and effective in use and capable of economical manufacture.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:—

1. A pump comprising a casing provided with two adjoining chambers communicating with each other at their adjoining sides; crank shafts operating in said chambers, said crank shafts provided with loosely engageable radially yieldable cranks; tubular contact members having bores large enough to loosely embrace said cranks and shafts and being independently maintained in continuous contact with the peripheries of said chambers by said cranks; a movable blade connecting said contact members and passing through the communication between said chambers; and inlet and outlet means communicating with said chambers on opposite sides of their communication with each other, substantially as described.

2. A pump comprising a casing provided with two adjoining chambers communicating with each other at their adjoining sides; crank shafts operating in said chambers; tubular contact members loose on said crank shafts and contacting with the peripheries of said chambers, one of said contact members being grooved, the groove in one of said contact members extending entirely through the wall thereof at its ends and bridged at the central portion; a blade rigidly connected with the other of said contact members, passing through the communication between said chambers and provided with extensions passing through said groove on opposite sides of the bridge thereof; and inlet and outlet means communicating with said chambers on opposite sides of their communication with each other, substantially as described.

3. A pump comprising a casing provided with two adjoining chambers communicating with each other at their adjoining sides; crank shafts operating in said chambers and provided with yieldable cranks; tubular contact members loose on said crank shafts and contacting with the peripheries of said chambers, one of said contact members being grooved, the groove in one of said contact members extending entirely through the wall thereof at its ends and bridged at the central portion; a blade rigidly connected with the other of said contact members, passing through the communication between said chambers and provided with extensions passing through said groove on opposite sides of the bridge thereof; and inlet and outlet means communicating with said chambers on opposite sides of their communication with each other, substantially as described.

4. A pump comprising a casing provided with two adjoining parallel cylindrical chambers intersecting each other to form an open communication between them at their adjoining sides; shafts operating in said chambers coaxially therewith; spring-held yieldable crank arms on said shafts; intermeshing gears on said shafts outside of said chambers; contact members in the form of tubes coextensive in length with said chambers, having bores large enough to loosely embrace said crank arms and shafts and contacting with the peripheries of said chambers; a blade fixed in one of said tubes, passing through the communication between said chambers and slidably connected with the other of said tubes; and inlet and outlet means communicating with said chambers on opposite sides of their communication with each other, substantially as described.

5. A pump comprising a casing provided with two adjoining parallel cylindrical chambers intersecting each other to form an open communication between them at their adjoining sides; shafts operating in said chambers coaxially therewith; spring-held yieldable crank arms on said shafts; intermeshing gears on said shafts outside of said chambers; contact members in the form of tubes coextensive in length with said chambers, having bores large enough to loosely embrace said crank arms and shafts and contacting with the peripheries of said chambers; a blade fixed in one of said tubes, passing through the communication between said chambers and slidably connected with the other of said tubes; an inlet passage leading into both of said chambers at one side of their communication with each other; an outlet passage leading from both of said chambers at the opposite side of their communication with each other; and inlet and outlet pipes connected with said passages, substantially as described.

In testimony whereof we have signed our names to this specification in the presence of two subscribing witnesses.

JOSEPH R. RICHER.
JOHN O. HESSLER.

Witnesses:
Joshua R. H. Potts,
B. G. Richards.